United States Patent
Hsu

(10) Patent No.: US 7,317,796 B2
(45) Date of Patent: Jan. 8, 2008

(54) SYSTEM AND METHOD FOR VIDEO STREAM ENCRYPTION

(75) Inventor: Wen-Hao Hsu, Kaoshiung (TW)

(73) Assignee: Institute of Information Industry, Taipei (TW)

(*) Notice: Subject to any disclaimer, the term of this patent is extended or adjusted under 35 U.S.C. 154(b) by 749 days.

(21) Appl. No.: 10/664,438

(22) Filed: Sep. 18, 2003

(65) Prior Publication Data

US 2004/0258242 A1 Dec. 23, 2004

(30) Foreign Application Priority Data

Jun. 17, 2003 (TW) .............................. 92116350 A

(51) Int. Cl.
*H04K 1/08* (2006.01)
*H04M 1/70* (2006.01)
*H04M 3/56* (2006.01)

(52) U.S. Cl. ..................... 380/41; 380/254; 380/270

(58) Field of Classification Search ................ 380/41, 380/254, 270

See application file for complete search history.

(56) References Cited

U.S. PATENT DOCUMENTS

| | | | | |
|---|---|---|---|---|
| 6,957,350 B1 * | 10/2005 | Demos | ....................... | 380/203 |
| 2002/0054639 A1 * | 5/2002 | Kawashima et al. | ... | 375/240.03 |
| 2003/0053702 A1 * | 3/2003 | Hu | ............................. | 382/238 |

* cited by examiner

*Primary Examiner*—Kambiz Zand
*Assistant Examiner*—Venkat Perungavoor
(74) *Attorney, Agent, or Firm*—Thomas, Kayden, Horstemeyer & Risley

(57) ABSTRACT

A system and method of video stream encryption. A storage device stores a first quantization scale and a second quantization scale. An encryption application receives video data, a first quantization scale and a second quantization scale, generating quantized data by dividing the video into the first quantization scale, generating supplementary data by subtracting the quantized data multiplied by the first quantization scale from the video data, generating quantized supplementary data by dividing the supplementary data into the second quantization scale, and generating encrypted quantized supplementary data using variable length encoding and symmetrical/asymmetrical encryption algorithm.

15 Claims, 7 Drawing Sheets

| Layer | Quantization Scale |
|---|---|
| 1 | 1,000 |
| 2 | 100 |
| 3 | 10 |

FIG. 3

SYSTEM AND METHOD FOR VIDEO STREAM ENCRYPTION

BACKGROUND OF THE INVENTION

1. Field of the Invention

The present invention relates to digital video streaming, and more particularly to a method and system for video stream encryption.

2. Description of the Related Art

Digital video stream encryption systems have been used for access authentication. FIG. 1 is a diagram of a conventional digital video stream encryption system. An encryption application 11 receives video data video 1 to encrypt and outputs an encrypted video stream video 2 to a corresponding decryption application 12 via various media, such as microwave, internet, or cable. The decryption application 12 is responsible for decrypting the encrypted video stream video 2 to restore the original video stream video 1.

A digital video stream can be seen as a series of static frames, requiring considerable storage capacity and transmission bandwidth. A 90-min full color video stream, for example, having 640×480 pixels/frame and 15 frames/second, requires bandwidth of 640×480 (pixels/frame)×3 (bytes/pixel)×15(frames/sec)=13.18(MB/sec) and file size of 13.18(MB/sec)×90×60=69.50(GB). Such a sizeable digital video stream is difficult to store and transmit in real time, thus, many compression techniques have been introduced.

MPEG standards ensure video encoding systems create standardized files that can be opened and played on any system with a standards-compliant decoder. Digital video contains spatial and temporal redundancies, which may be compressed without significant sacrifice. MPEG coding is a generic standard, intended to be independent of a specific application, involving compression based on statistical redundancies in temporal and spatial directions. Spatial redundancy is based on the similarity in color values shared by adjacent pixels. MPEG employs intra-frame spatial compression on redundant color values using DCT (Discrete Cosine Transform) and quantization. Temporal redundancy refers to identical temporal motion between video frames, providing smooth, realistic motion in video. MPEG relies on prediction, more precisely, motion-compensated prediction, for temporal compression between frames. MPEG utilizes, to create temporal compression, I-Frames, B-frames and P-frames. An I-frame is an intra-coded frame, a single image heading a sequence, with no reference to previous or subsequent frames. MPEG-1 compresses only within the frame with no reference to previous or subsequent frames. P-frames are forward-predicted frames, encoded with reference to a previous I- or P-frame, with pointers to information in a previous frame. B-frames are encoded with reference to a previous reference frame, a subsequent reference frame, or both. Motion vectors employed may be forward, backward, or both.

MPEG achieves compression by quantizing the coefficients produced by applying a DCT to 8×8 blocks of pixels in an image and through motion compensation. Quantization is basically division of the DCT coefficient by a quantization scale related to quality level, with higher indices for greater compression but lower quality, and lower indices for the reverse.

In the past, conventional encryption techniques have normally encrypted entire compressed video stream, as have conventional decryption techniques. Several inherent limitations exist in this process. First, encrypted video stream is unreadable without corresponding decryption, such that preview is unavailable. In addition, much time is spent encrypting and decrypting the entire video stream.

In view of the limitations described, a need exists for a system and method of video stream encryption to provide both low quality digital video for preview and high quality encrypted stream for subsequent decryption, with reduced time spent encrypting and decrypting.

SUMMARY OF THE INVENTION

It is therefore an object of the present invention to provide a system and method of video stream encryption to provide both unencrypted low quality video for preview and encrypted supplementary data for subsequent decryption, enabling generation of high quality streaming video with reduced encryption and decryption time.

The system according to the invention comprises encryption and decryption systems for video stream. The encryption system includes a storage device, a first compression application, an encryption application, and a second compression application. The storage device stores at least one quantization scale record, each constituent of which is an integer. In multilayer scales, a lower layer has a higher number than a higher layer. The first compression application compresses video data stream using motion prediction and discrete cosine transformation (DCT), generating a compressed video for subsequent operations. The encryption application first receives the compressed video from the first compression application and reads at least one quantization scale from the storage device. The compressed video is quantized by a method associated with the quantization scale to generate Q data and multilayer quantized supplementary data (QR data) thereof. Finally, the QR data for each layer is encoded using variable length coding (VLC) and encrypted for each layer. The second compression application inputs the Q data and encrypted QR data for each layer, encodes the Q data using VLC, combines the encoded Q data and encrypted QR data for each layer in an encrypted stream for transfer to the pre-decryption application in the decryption system.

BRIEF DESCRIPTION OF THE DRAWINGS

The present invention can be more fully understood by reading the subsequent detailed description and examples with references made to the accompanying drawings, wherein:

FIG. 3 is a diagram of an exemplary quantization scale record according to an embodiment of the invention;

DETAILED DESCRIPTION OF THE INVENTION

Figure 1:
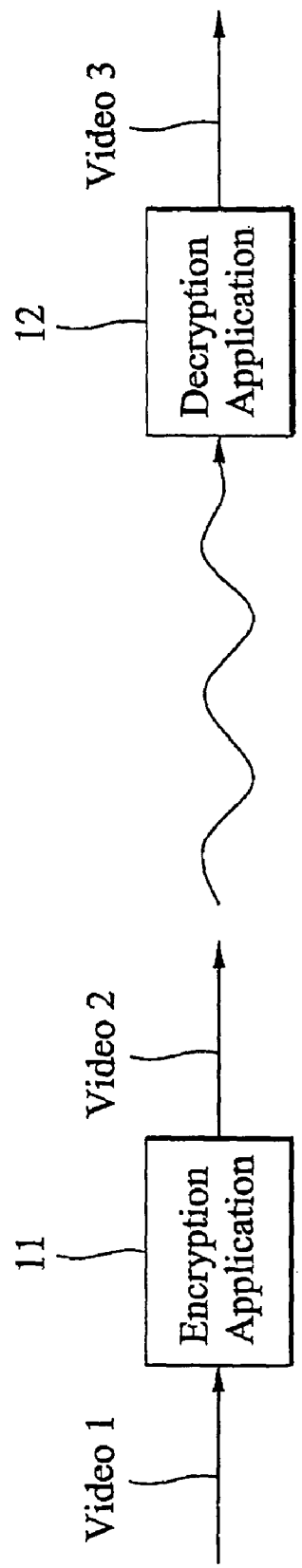
FIG. 1 is a diagram of a conventional digital video stream encryption system.
Figure 2:
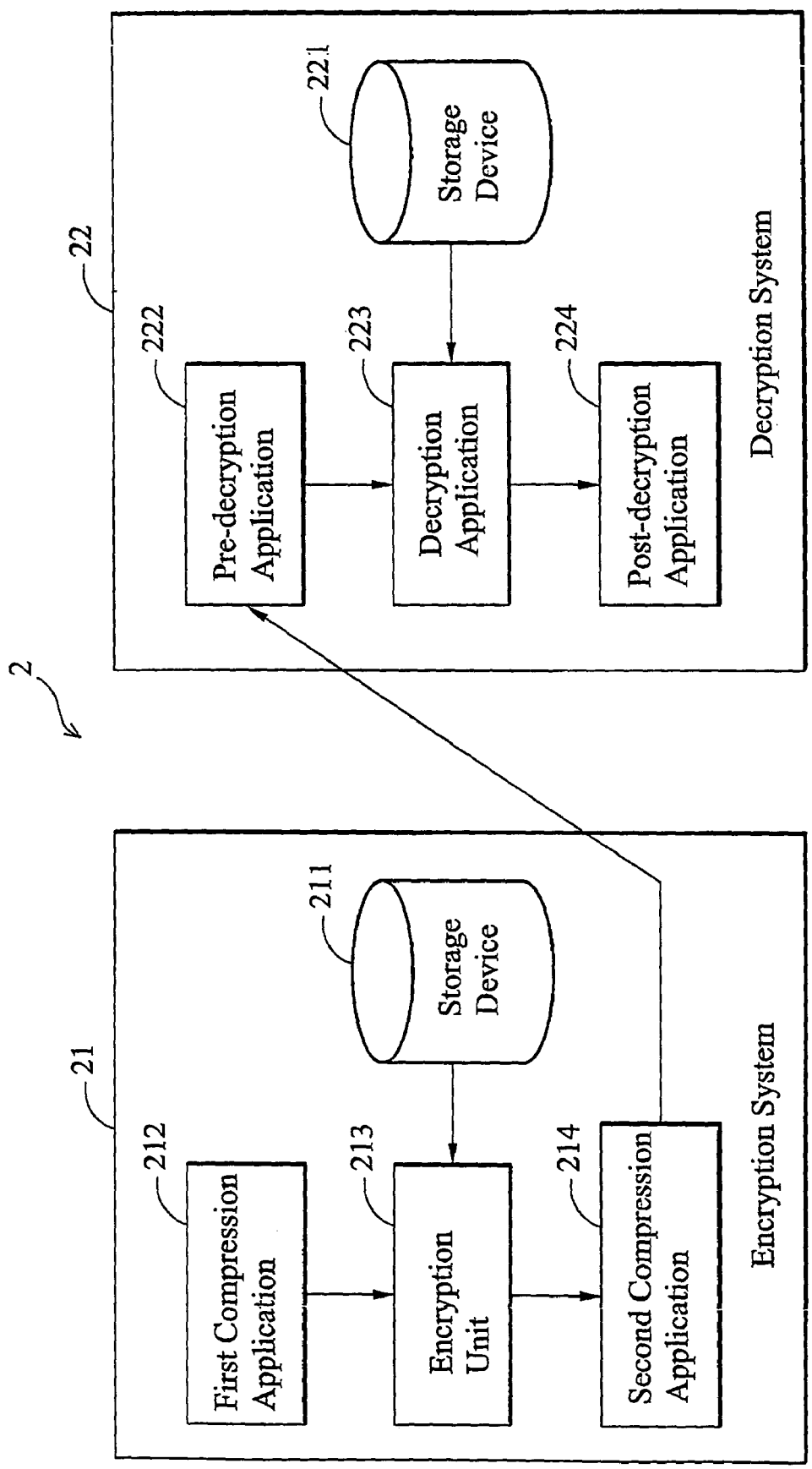
FIG. 2 is a diagram of a system of video stream encryption according to the invention.

FIG. 2 is a diagram of a system of video stream encryption according to the invention. The entire system includes an encryption system 21 and a decryption system 22. The two systems can be implemented in separate computers or devices connected by a network such as Local Area Network (LAN), Wide Area Network (WAN), mobile network, Internet, or others. The encryption system 21 can be implemented in a mainframe, workstation, server, personal computer, or other device.

The encryption system 21 includes a storage device 211, a first compression application 212, an encryption application 213 and a second compression application 214.

Figure 3:
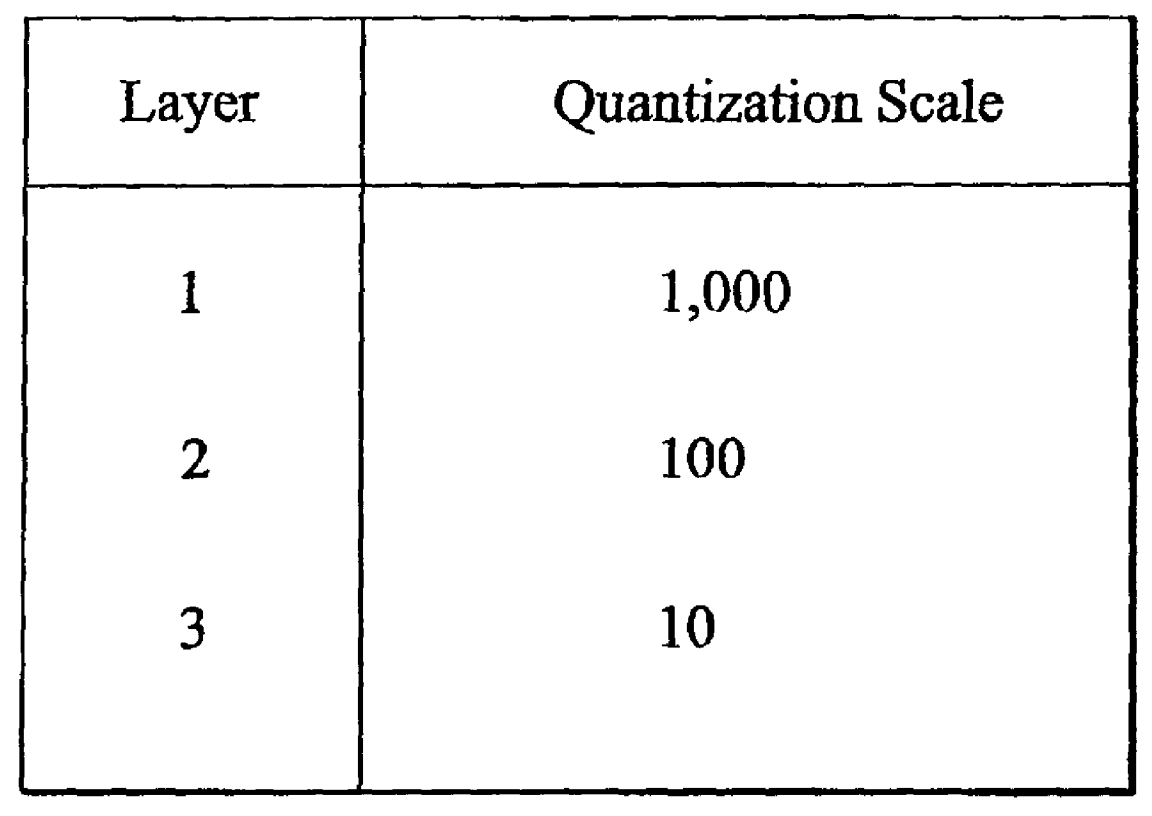

The storage device 211 stores at least one quantization scale record, each constituent of which is an integer. FIG. 3 is a diagram of an exemplary quantization scale record containing three scales, 1,000, 100, and 10. In multilayer scales, a lower layer has a higher number than a higher layer. The quantization scale record can be implemented in a database, file, predefined variable, or other form that can be loaded into memory for further processing.

The first compression application 212 compresses video data stream using motion prediction and discrete cosine transformation (DCT), generating a compressed video for subsequent operations.

The encryption application 213 first receives the compressed video from the first compression application 212 and reads at least one quantization scale from the storage device 211. The compressed video is quantized according to the quantization scale to generate Q data and multilayer quantized supplementary data (QR data) therefrom. Finally, the QR data for each layer is encoded using variable length coding (VLC) and encrypted using symmetrical/asymmetrical encryption algorithm such as advanced encryption standard (AES), RSA, data encryption standard (DES), elliptic curve ciphers (ECC), or others.

A recursive program composed of pseudo codes is introduced in the following, using the code sequence:

```
n = 0
Integer FUNCTION qProcess(Integer video)
    n = n + 1
    if (n <= N)
        D_n = qProcess (video − (video DIV Q_n) ×Q_n)
    else
        exit
    endif
    return (video DIV Q_n)
END FUNCTION
```

In which N denotes a number of layers, n denotes an index of layer current in process, DIV denotes an operation used to get a quotient, video denotes the compressed video data, $D_n$ denotes the Q data of layer n and $Q_n$ denotes the quantization scale of layer n.

For example, if $D_o$ is 13,925 represents a compressed video data, and the quantization scale of three layers as shown in FIG. 3, $Q_1=1,000$, $Q_2=100$ and $Q_3=10$ for respective layers, qProcess is executed regarding $D_o$ as receive data, thereby generating results in sequence, $D_3=2$, $D_2=9$ and $D_1=13$, in which $D_1$ represents Q data, and $D_2$ and $D_3$ represent the QR data of layer 1 and layer 2 respectively. Next, the encryption application 213 uses VLC to encode the QR data for each layer and one or two different encryption methods corresponding to the particular layer to encrypt the QR data. The encryption application 213 finally outputs the Q data and encrypted QR data for each layer to the second compression application 214.

The second compression application 214 inputs the Q data and encrypted QR data, encodes the Q data using VLC, combines the encoded Q data and encrypted QR data for each layer into an encrypted stream for transfer to the pre-decryption application 222 in the decryption system 22.

The decryption system 22 includes a storage device 221, a pre-decryption application 222, a decryption application 223, and a post-decryption application 224. The storage device 221 stores the quantization scale record as that in the storage device 211.

The pre-decryption application 222 receives the encrypted stream from the second compression application 214, separates the encrypted stream into encoded Q data and encrypted QR data for each layer, uses VLD to restore the Q data, and outputs the Q data and encrypted QR data to the decryption application 223.

The decryption application 223 decrypts and decodes the encrypted QR data using VLD to restore the QR data. The number of layers decrypted depends on authorized access, with layer complexity reflected in streaming quality. After that, Q data and QR data undergo inverse quantization to generate a compressed video.

A program composed of pseudo codes in the decryption application 213 produces the compressed video data, utilizing the following code sequence:

```
FUNCTION iqProcess(Integer D_1, N, Dif[ ])
    D = D_1 × Q_1
    for i = 2 to N
        D = D + (Dif_i×Q_i)
    Loop
END FUNCTION
```

In which N denotes the number of layers decrypted, D denotes de-quantized data of layer 1, $Dif_i$ de-quantized supplementary data of layer i, and $Q_i$ the quantization scale of layer i.

Here, D=13, $Diff_2=9$, $Diff_3=2$ and the quantization scale for each layer is as shown in FIG. 3. The result D, the compressed video data, produced using the above program is 13,000 since there is no decryption authorization. In addition, D, 13,900 or 13,920, is produced since layer 2 or layer 3 QR data decryption is authorized respectively.

The decryption application 223 outputs the compressed video undergoing decoding, de-quantization, and decryption to the post-decryption application 224.

The post-decryption application 224 decompresses the compressed video using inverse discrete cosine transformation (IDCT) and motion compensation.

Figure 4:
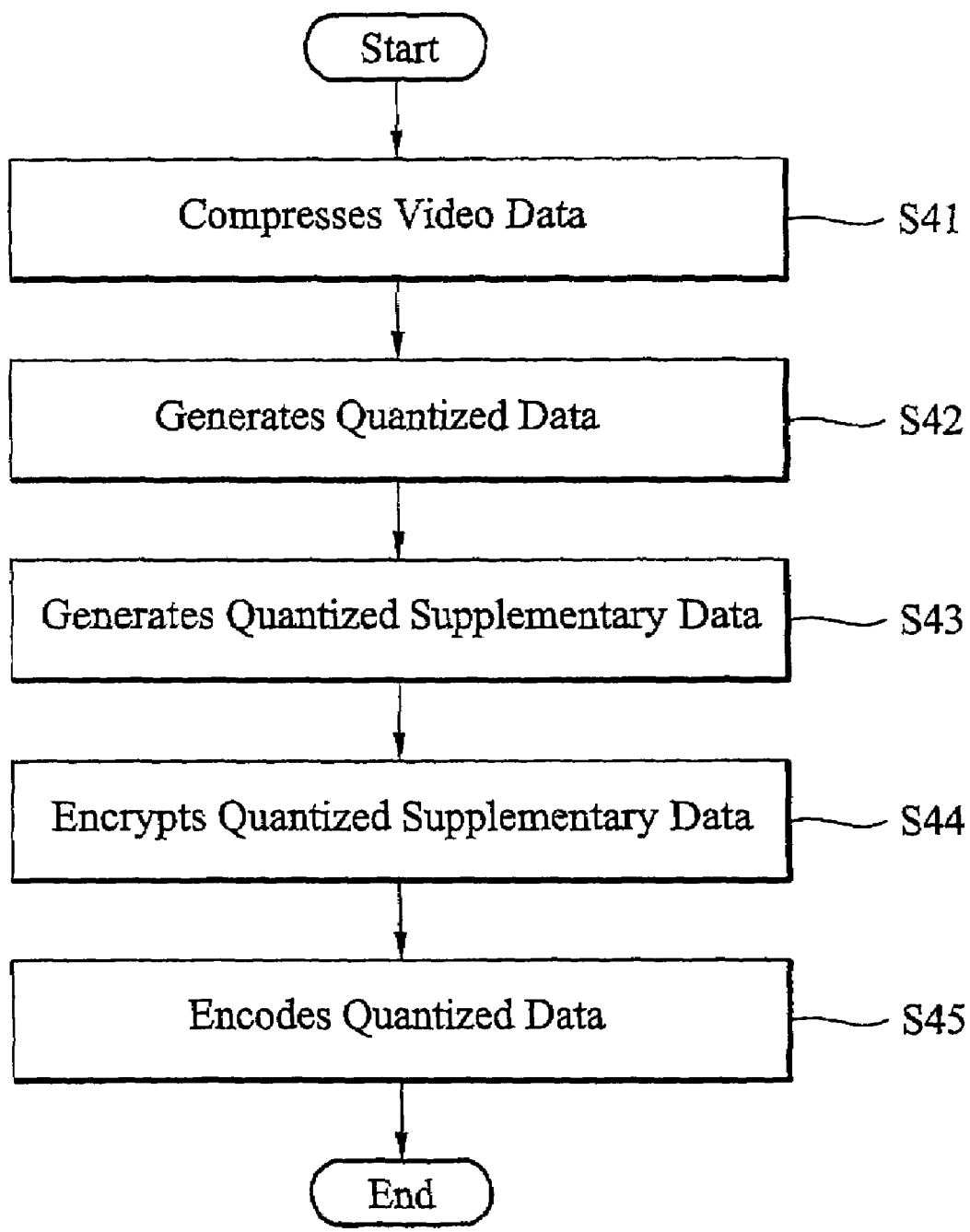
FIG. 4 is a flowchart showing a method of video stream encryption according to the invention.

FIG. 4 is a flowchart showing a method of video stream encryption according to the invention.

First, in step S41, video data stream is compressed using motion prediction and discrete cosine transformation (DCT), generating a compressed video for subsequent operations.

In step S42, Q data is calculated using the quantization method associated with the quantization scale of layer 1.

In step S43, QR data for each layer is calculated using qProcess associated with the quantization scales for each layer.

In step S44, the QR data for each layer first is encoded using VLC method, and encrypted using one or two different encryption methods corresponding to the particular layer.

In step S45, the Q data is encoded using VLC.

Figure 5:
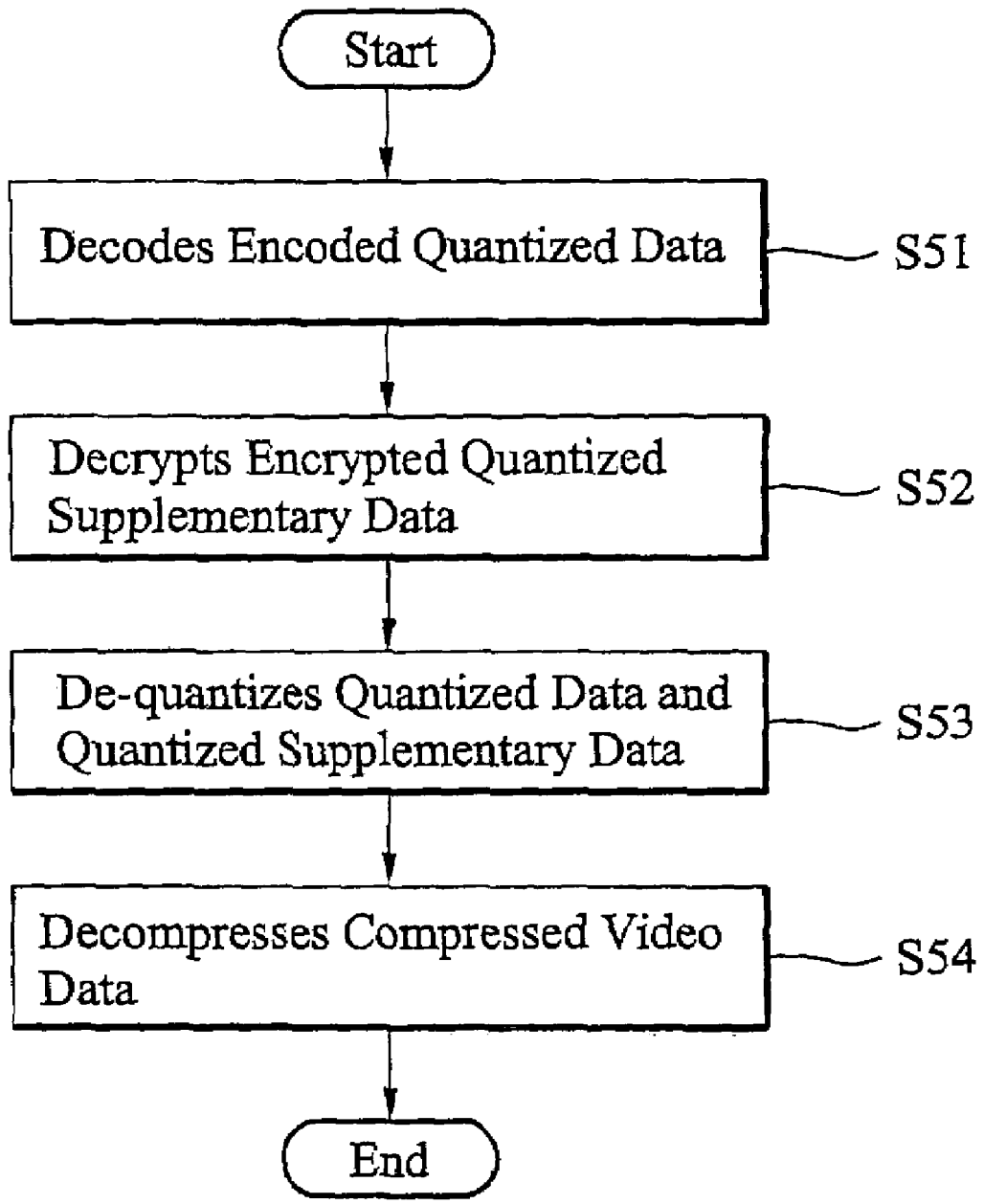
FIG. 5 is a flowchart showing a method of video stream decryption corresponding to the encryption method of the invention.

FIG. 5 is a flowchart showing a method of video stream decryption according to the invention.

First, in step S51, the encoded Q data is decoded using the VLD method to restore the Q data.

In step S52, the multilayer encrypted QR data is decrypted and decoded using VLD. The number of layers decrypted depends on authorized access.

In step S53, the compressed video is restored using iqProcess associated with the multilayer quantization scales.

In step S54, video is decompressed using inverse discrete cosine transformation (IDCT) and motion compensation.

Figure 6:
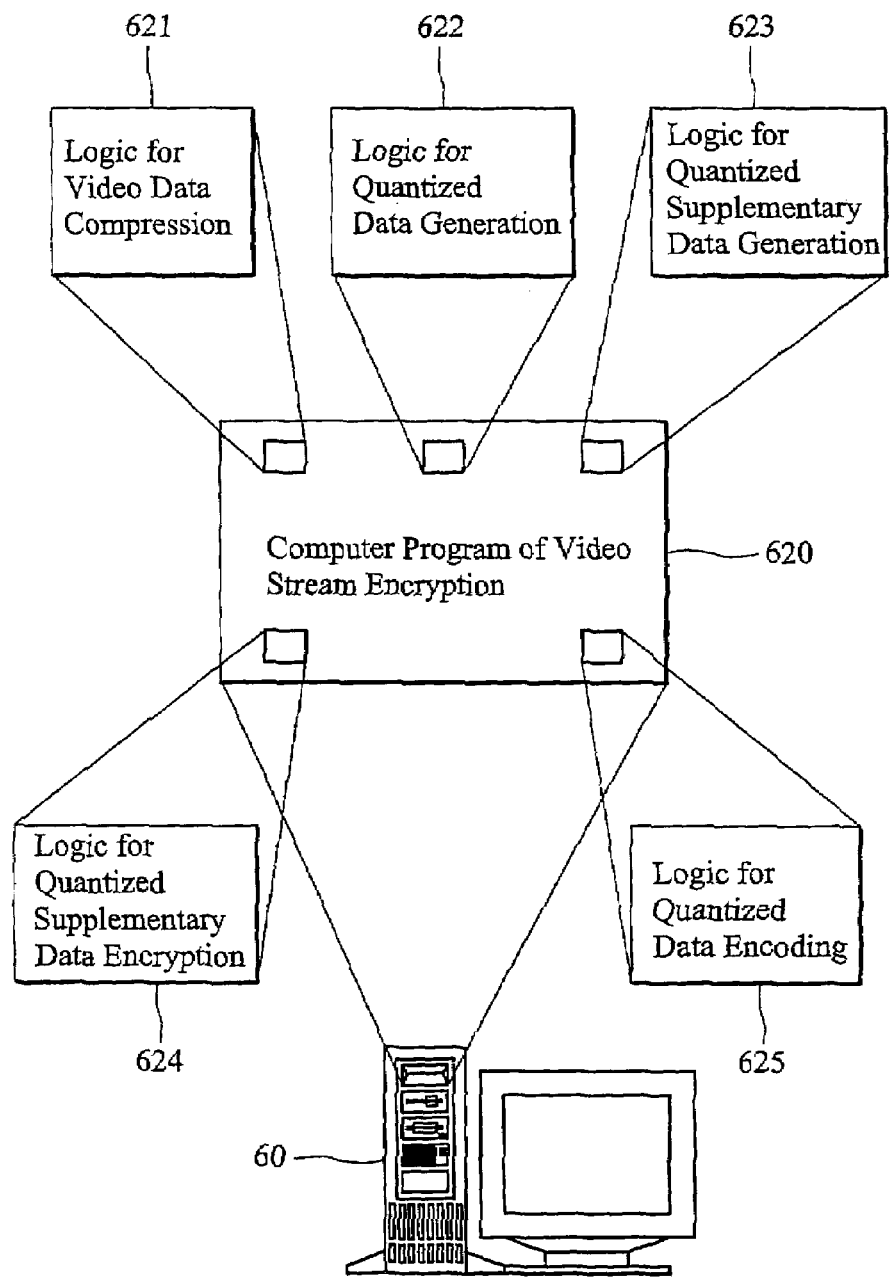
FIG. 6 is a diagram of a storage medium for a computer program providing the method of video stream encryption according to the invention.
Figure 7:
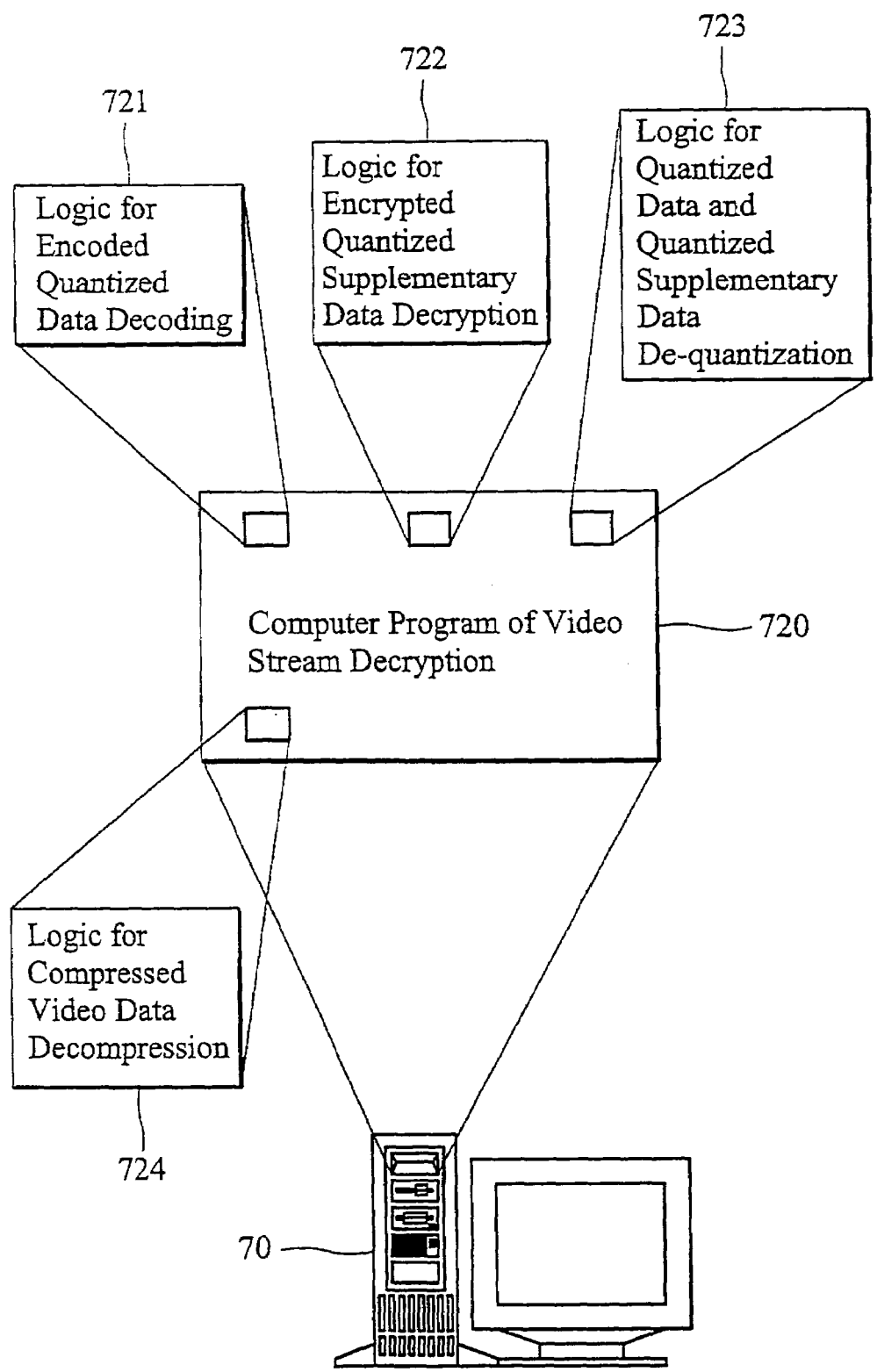
FIG. 7 is a diagram of a storage medium for storing a computer program providing a method of video stream decryption corresponding to the encryption method of the invention.

The methods and system of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The storage mediums are shown in FIG. 6 and FIG. 7.

The system and method of this invention provide both unencrypted low quality video for preview and encrypted supplementary data for subsequent decryption, enabling generation of high quality streaming video data, with reduced encryption and decryption time.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system of video stream encryption, comprising:
a storage device capable of storing a first quantization scale and a second quantization scale, wherein the first quantization scale is greater than the second quantization scale; and
an encryption application coupled to the storage device, configured to receive video data, the first quantization scale and the second quantization scale, generate quantized data by a first equation, generate supplementary data by a second equation, generate quantized supplementary data by a third equation, encode and encrypt the quantized supplementary data using variable length encoding and symmetrical/asymmetrical encryption algorithm,
wherein the first equation is represented by $D_q=V/Q_1$, the second equation is represented by $D_s=V-(V/Q_1)\times Q_1$, the third equation is represented by $D_{qs}=Ds/Q2$, $D_q$ represents the quantized data, V represents the video, $Q_1$ represents the first quantization scale, $D_s$ represents the supplementary data, $D_{qs}$ represents the quantized supplementary data, and $Q_2$ represents the second quantization.

2. The system as claimed in claim 1 further comprising a first compression application configured to receive and compress video data.

3. The system as claimed in claim 2 wherein the video data is compressed using motion prediction.

4. The system as claimed in claim 2 wherein the video data is compressed using discrete cosine transformation (DCT).

5. The system as claimed in claim 1 further comprising a second compression application configured to receive the quantized data and generate encoded quantized data using variable length encoding.

6. A method of video stream encryption, comprising using an electronic device having a CPU to perform the steps of:
receiving video data, a first quantization scale and a second quantization scale, wherein the first quantization scale is greater than the second quantization scale;
generating quantized data by a first equation;
generating supplementary data by a second equation;
generating quantized supplementary data by a third equation; and
generating encrypted quantized supplementary data using variable length encoding and symmetrical/asymmetrical encryption algorithms,
wherein the first equation is represented by $D_q=V/Q_1$, the second equation is represented by $D_s=V-(V/Q_1)\times Q_1$, the third equation is represented by $D_{qs}=Ds/Q2$, $D_q$ represents the quantized data, V represents the video, $Q_1$ represent the first quantization scale, $D_s$ represents the supplementary data, $D_{qs}$ represents the quantized supplementary data, and $Q_2$ represents the second quantization.

7. The method as claimed in claim 6 further comprising compressing the video data.

8. The method as claimed in claim 7 wherein the compression method uses motion prediction.

9. The method as claimed in claim 7 wherein the compression method uses discrete cosine transformation (DCT).

10. The method as claimed in claim 6, further comprising generating encoded quantized data from the quantized data using variable length encoding.

11. A storage medium for storing a computer program providing a method of video stream encryption, comprising using a computer to perform the steps of:
receiving video data, a first quantization scale and a second quantization scale, wherein the first quantization scale is greater than the second quantization scale;
generating quantized data by a first equation;
generating supplementary data by a second equation;
generating quantized supplementary data by a third equation; and
generating encrypted quantized supplementary data using variable length encoding and symmetrical/asymmetrical encryption algorithm,
wherein the first equation is represented by $D_q=V/Q_1$, the second equation is represented by $D_s=V-(V/Q_1)\times Q_1$, the third equation is represented by $D_{qs}=Ds/Q2$, $D_q$ represents the quantized data, V represents the video, $Q_1$ represents the first quantization scale, $D_s$ represents the supplementary data, $D_{qs}$ represents the quantized supplementary data, and $Q_2$ represents the second quantization.

12. The method as claimed in claim 11, further comprising compressing the video data.

13. The method as claimed in claim 12 wherein the compression method uses motion prediction.

14. The method as claimed in claim 12 wherein the compression method uses discrete cosine transformation (DCT).

15. The method as claimed in claim 11, further comprising generating encoded quantized data from the quantized data using variable length encoding.

* * * * *